(12) United States Patent
Lundgren

(10) Patent No.: US 8,905,077 B2
(45) Date of Patent: Dec. 9, 2014

(54) HYDRAULIC MAIN VALVE AND AUXILIARY VALVE

(76) Inventor: Bertil Lundgren, Bjärtrå (SE)

( * ) Notice: Subject to any disclaimer, the term of this patent is extended or adjusted under 35 U.S.C. 154(b) by 218 days.

(21) Appl. No.: 13/378,399

(22) PCT Filed: Jun. 23, 2010

(86) PCT No.: PCT/SE2010/050719
§ 371 (c)(1),
(2), (4) Date: Dec. 15, 2011

(87) PCT Pub. No.: WO2010/151219
PCT Pub. Date: Dec. 29, 2010

(65) Prior Publication Data
US 2012/0125459 A1   May 24, 2012

(30) Foreign Application Priority Data

Jun. 24, 2009 (SE) ...................................... 0900867

(51) Int. Cl.
| | | |
|---|---|---|
| *F15B 13/08* | (2006.01) | |
| *F16L 41/02* | (2006.01) | |
| *E02F 9/22* | (2006.01) | |
| *F16L 41/12* | (2006.01) | |
| *E02F 3/96* | (2006.01) | |

(52) U.S. Cl.
CPC ............... *E02F 9/2267* (2013.01); *F16L 41/12* (2013.01); *E02F 3/96* (2013.01); *F15B 13/0871* (2013.01); *F15B 13/0825* (2013.01); *F15B 13/0896* (2013.01)
USPC .................................. 137/625.2; 137/561 A

(58) Field of Classification Search
USPC .................... 137/884, 561 A, 561 R
See application file for complete search history.

(56) References Cited

U.S. PATENT DOCUMENTS

| | | | | |
|---|---|---|---|---|
| 3,840,047 A | * | 10/1974 | Gibbins | ......................... 137/884 |
| 4,130,137 A | * | 12/1978 | Lane | ............................. 137/884 |
| 4,557,291 A | | 12/1985 | Hashimoto | |

(Continued)

OTHER PUBLICATIONS

International Search Report for PCT/SE2010/050719.

*Primary Examiner* — Stephen M Hepperle
*Assistant Examiner* — Seth W Mackay-Smith
(74) *Attorney, Agent, or Firm* — Marvin Petry; Stites & Harbison PLLC

(57) ABSTRACT

The present invention relates to a hydraulic auxiliary valve device (1) adapted to be connected to a hydraulic main valve (20) on a work vehicle, which work vehicle comprises a hydraulic system comprising a pump and a tank, the auxiliary valve device (1) comprises: —a first motor port connection (4A) and a second motor port connection (4B) arranged to be connected to a first motor port and a second motor port, respectively, on a double acting hydraulic motor, in particular a double acting hydraulic cylinder, —a pump lead-through (2), which connects the pump input port connection (2A) of the auxiliary valve device (1) to the pump connection output port (2B); —a tank lead-through (3), which connects the tank input port connection (3A) of the auxiliary valve device (1) to the tank connection output port (3B); and —a control valve (IA) provided with two open positions, which control valve (1A) in the first open position connects the pump input port connection (2A) to the first motor port connection (4A) and the tank input port connection (3A) to the second motor port connection (4B), and in the second open position connects the pump input port connection (2A) to the second motor port connection (4B) and the tank input port connection (3A) to the first motor port connection (4A).

2 Claims, 6 Drawing Sheets

(56) References Cited

U.S. PATENT DOCUMENTS

| | | | |
|---|---|---|---|
| 4,561,462 A | * 12/1985 | Hashimoto | 137/596.13 |
| 4,582,089 A | * 4/1986 | Nimberger | 137/884 |
| 7,290,558 B2 | * 11/2007 | DeChard et al. | 137/312 |
| 7,293,494 B2 | * 11/2007 | Morency et al. | 91/54 |

* cited by examiner

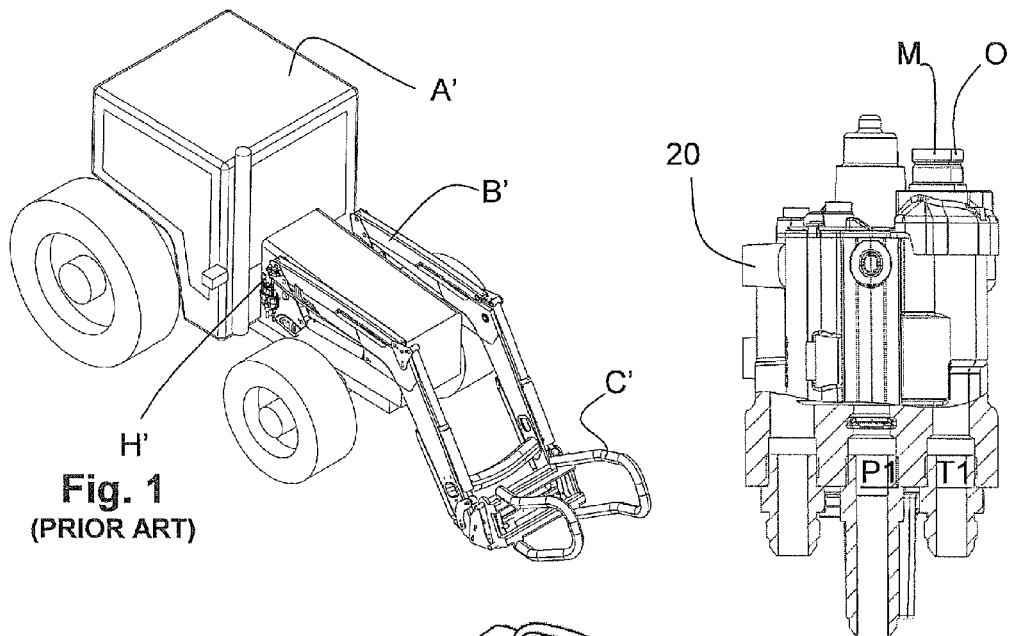
Fig. 3
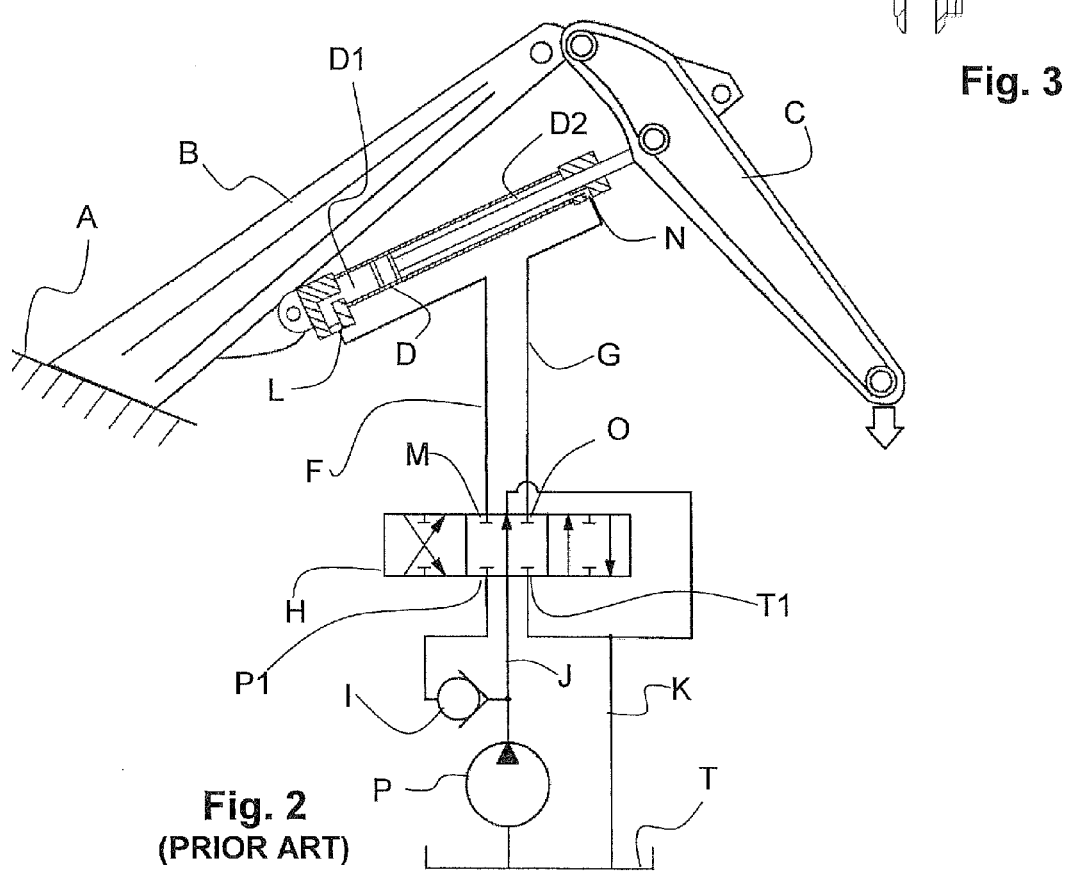
Fig. 1
(PRIOR ART)
Fig. 2
(PRIOR ART)

US 8,905,077 B2

HYDRAULIC MAIN VALVE AND AUXILIARY VALVE

FIELD OF THE INVENTION

The present invention relates to an auxiliary valve and a main valve adapted to be connected to an auxiliary valve, which in particular are adapted to be arranged on a tractor provided with a front end loader.

BACKGROUND OF THE INVENTION

Tractors provided with front end loaders and any associated equipment controlled by hydraulics are generally provided with a valve arranged at the mounting structure of the front end loader or the base on the right side of the tractor, which connects the hydraulics of the tractor with the hydraulics of the front end loader and by means of which the operator controls the equipment. Conventional valves have two connection ports to the hydraulics of the tractor, one connection port to the pump of the tractor and one connection port to the tank of the tractor. Further, the valve normally has two pairs of motor port connections to the front end loader, of which one of the motor port connections in each pair is connected to one of the cylinder chambers of a pressure cylinder and the other motor port connection in the same pair is connected to the other cylinder chamber of the same pressure cylinder. A first such pressure cylinder may e.g. be arranged such that, when the first cylinder chamber of the pressure cylinder is filled with hydraulic fluid and the other is emptied to the tank, the front end loader is elevated, whereas the front end loader instead is lowered when the other cylinder chamber of the pressure cylinder is filled with hydraulic fluid and the other is emptied to the tank. The two motor port connections of the other pair may in the same example be connected to a pressure cylinder which controls a bucket on the front end loader such that it may be tipped up and down. Depending on whether the front end loader or the bucket is to be moved in the same direction as the load or in the opposite direction, the pump has to work more or less hard to achieve the necessary pressure for the operation.

For certain applications there is a need for yet further connections. A front end loader provided with a bucket may e.g. need to be completed with a gripping device to fasten and/or compress details in the bucket. In such a case, the tractor needs to be equipped with a valve which has three pairs of motor port connections to the front end loader. A problem is that valves are expensive, which means that it is expensive to exchange a functional valve provided with two pairs of motor port connections for a valve provided with three pairs of motor port connections.

SUMMARY OF THE INVENTION

An object of the present invention is to provide a valve arrangement which allows a more flexible use than conventional valves.

According to a first aspect, the present invention relates to a hydraulic auxiliary valve device adapted to be connected to a hydraulic main valve on a work vehicle, which work vehicle comprises a hydraulic system comprising a pump and a tank, the auxiliary valve device comprises:

a first motor port connection and a second motor port connection arranged to be connected to a first motor port and a second motor port, respectively, on a double acting hydraulic motor, in particular a double acting hydraulic cylinder, an inlet connection adapted to be connected to a hydraulic system on the work vehicle, which inlet connection comprises a pump input port connection, for connection to the pump of the hydraulic system, and a tank input port connection for connection to the tank of the hydraulic system;

an outlet connection adapted to be connected to the main valve, which outlet connection comprises a pump connection output port for connection to a pump input port on the main valve, and a tank connection output port, for connection to a tank input port on the main valve;

a pump lead-through, which connects the pump input port connection of the auxiliary valve device to the pump connection output port;

a tank lead-through, which connects the tank input port connection of the auxiliary valve device to the tank connection output port;

a control valve provided with two open positions, wherein the control valve in the first open position connects the pump input port connection to the first motor port connection and the tank input port connection to the second motor port connection, and in the second open position connects the pump input port connection to the second motor port connection and the tank input port connection to the first motor port connection.

According to a second aspect, the present invention relates to a hydraulic valve set comprising an above mentioned auxiliary valve device, and a main valve for connection to the auxiliary valve device, which main valve comprises a first and a second pair of motor port connections, each comprising a first motor port connection and a second motor port connection arranged to be connected to a first motor port and a second motor port, respectively, on the respective double acting hydraulic motors. The main valve further has an inlet connection arranged to be connected to a hydraulic system on the work vehicle, either directly or via the main valve, the inlet connection comprises a pump connection port for connection to the pump of the hydraulic system, and a tank connection port for connection to the tank of the hydraulic system, which ports are designed to fit to the pump connection output port and the tank connection output port, respectively, of the auxiliary valve device.

An advantage of the present invention is that it provides for a flexible solution adaptable according to requirements, whereby it gives the user options and possibility of economical savings.

SHORT DESCRIPTION OF THE APPENDED DRAWINGS

Below the present invention is described more in detail with reference to the appended drawings.

FIG. 1 shows a tractor provided with a front end loader and a tool;

FIG. 2 shows a conventional control valve connected to a lifting beam;

FIG. 3 shows a main valve according to the invention;

DETAILED DESCRIPTION OF PREFERRED EMBODIMENTS OF THE INVENTION

Figure 4:
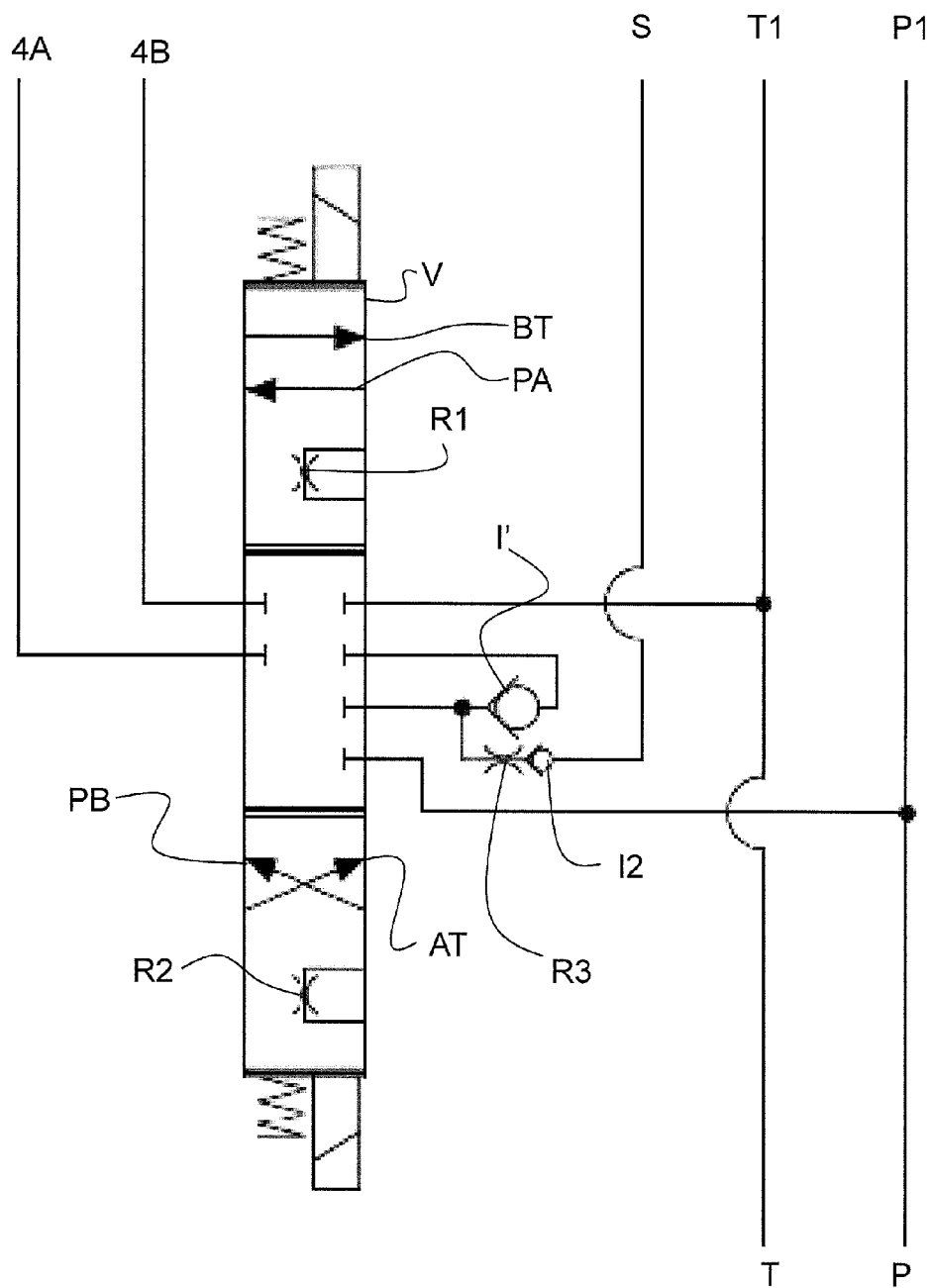
FIG. 4 shows a simplified hydraulic diagram of the valve set according to the present invention.

FIG. 1 shows a schematic view of a tractor A' provided with a front end loader B' and a tool C' in the form of a gripping device mounted thereon. The front end loader B' and the associated equipment C' are controlled by means of hydraulics from the tractor via a valve H' arranged at the mounting of the front end loader B' or the base of the tractor A'. The valve H' connects the hydraulics of the tractor with the hydraulics of the front end loader B'. A tractor provided with a front end loader is a representative application of the present invention, another is shown in FIG. 2, where the front end loader B' is replaced by a lifting beam B.

The hydraulic manoeuvred lifting beam B shown in FIG. 2, is adapted to be mounted on a vehicle which in the figure corresponds to a frame A with a swivel beam B, which supports a beam arm C at its upper end. Between the beam arm C and the foot of the beam B, a double acting hydraulic motor in the form of a hydraulic lifting cylinder D, is inserted. Lines F and G connects both the lifting cylinder chambers D1 and D2 to a control valve H, which in the illustrated example is lever controlled and in its turn is connected to a hydraulic pump P and a tank T via additional lines J and K, respectively. For connection to these connections, the control valve H is provided with a pump input port P1 and a tank input port T1.

Further, FIG. 2 schematically and in a simplified way shows the part of the hydraulic system of the machine which is used to manoeuvre the lifting cylinder D. The lifting cylinder's first, lower chamber D1 (the lifting chamber), has a first motor port, which below is referred to as the lower lifting cylinder port L, because the motor consists of the lifting cylinder D. The line F connects this lifting cylinder port L to a first feed connection port or motor port connection M on the control valve H, which in the shown example is of open-centre type. The lifting cylinders second, upper chamber D2 (lowering chamber), is in a corresponding way provided with a second motor port, herein called upper lifting cylinder port N, which via the line G is connected to a second motor port O on the control valve H. When the control valve is in the position shown in FIG. 2, the pump flow runs with a very low pump pressure through the centre canal of the control valve to the line K and further to the tank T.

As soon as the control valve is manoeuvred in any direction, the centre canal will be partly closed and the pump P will be connected to one of the lifting cylinder chambers, and correspondingly, the other lifting cylinder chamber will be connected to the tank T. The pump delivers a certain flow which depends on the opening of the control valve H and the pressure in one of the connected lifting cylinder chambers. The flow will flow through the connected control valve H to the connected lifting cylinder chamber at the same time as the other lifting cylinder chamber correspondingly is emptied to the tank T, wherein the beam will move.

When raising the beam C, the control valve H directs the hydraulic fluid under high pressure from the pump, through the first motor port connection M and the line F to the lower chamber D1 in the lifting cylinder D. At the same time, the valve opens between the feed connection port M and the lower cylinder port L and between the upper cylinder port N and the tank input port O of the valve. When the valve is manoeuvred to such an extent that the pump pressure exceeds the pressure in the cylinder port, the non-return valve I opens and a flow starts to flow from the pump to the lower cylinder chamber D1. In case of further manoeuvring of the valve, the flow increases through the valve to the cylinder. At the same time, hydraulic fluid will flow, under low pressure, from the upper cylinder chamber D2, through the line G and the control valve H to the tank T.

The non-return valve I in the feed line J of the valve, prevents flow "in the wrong direction", in the opposite direction of the pump flow, upon activation of the valve, when the pump pressure is lower than the pressure in the chamber D1 or D2 which is to be filled, which otherwise could be a great danger.

In the case when the beam C is lowered, hydraulic fluid will be directed from the pump P through the second motor port connection O on the control valve H to the upper chamber D2 in the lifting cylinder D at the same time as hydraulic fluid is directed from the lower lifting cylinder chamber D1 to the tank T.

Upon manoeuvring, the valve opens between the lower cylinder port L and the tank T, which makes the cylinder move downwards in the Figure. At the same time, the centre-canal will close and the pump pressure will increase such that a flow from the pump to the suction side of the cylinder, i.e. the upper cylinder port, is created.

The valve H, as shown in FIG. 2, has a pump connection port P1 and a tank connection port T1, and two motor port connections M and O connected to opposite sides of the working cylinder D. However, as mentioned above, a valve normally has two pairs of motor port connections, connected to opposite sides of two separate working cylinders. Such a valve is shown in FIG. 3. The valve in FIG. 3 forms a main valve 20 according to the present invention, which in contrast to conventional valves is adapted to be connected to an auxiliary valve according to the invention. The main valve 20 has four motor port connections M, O, Q and R, whereof only two (M and O) are shown in FIG. 3.

In FIG. 4, a simplified hydraulic diagram of an auxiliary valve according to the present invention is shown. The auxiliary valve comprises a valve slide V, which is movable between two open positions and one closed position, in which it is arranged in FIG. 4. The auxiliary valve is adapted to be connected in series with the main valve of the system, such that it connects to the line between the pump P of the system and the pump input port P1 of the main valve, and the tank T of the system and the tank input port T1 of the main valve.

In the shown closed position, no flow runs through the valve slide V. If the valve is moved downwards, to a first opened position, the pump will be connected via the connection PA to the first motor port connection 4A of the auxiliary valve, at the same time as the other motor port connection 4B is connected via the connection BT to the tank T. The pump flow will then run via an optional restrictor R1 and further through a non-return valve I' before it reaches the first motor port connection 4A. At the same time a flow runs from the second motor port connection 4B via the connection BT to the tank T.

If the valve slide V instead is moved upwards, to a second opened position, the pump P will be connected via the connection PB to the second motor port connection 4B of the auxiliary valve, at the same time as the first motor port connection 4A is connected via the connection AT to the tank T. The pump flow runs via an optional second restrictor R2 and further through the non-return valve I' before it reaches the second motor port connection 4B of the auxiliary valve.

The restrictors R1 and R2 may have different sizes, e.g. to compensate for the different sizes of the cylinder chambers, i.e. such that a certain deflection of the controls of the operator in either direction gives an equally fast movement of the cylinder piston irrespective of in which direction the piston is moving. Thus, due to the different cylinder volumes a greater flow is necessary in order to move the cylinder piston with a certain velocity while the larger of the two chambers is being filled. Alternatively, the valve may be designed completely without restrictors.

The hydraulic diagram in FIG. 4 also shows a third restrictor R3 via which the control pressure is supplied via a non-return valve 12 to a control input S on the pump P. The control input S is needed so that the pump is able to sense which pressure it must produce. Generally, the pump generates a pressure which is about 15 bar higher than the pressure needed for the application which requires the highest pressure at the moment. The third restrictor R3 has no major function other than to restrict the flow such that merely a control flow is provided to the control input S. Consequently, the third restrictor R3 is also optional.

Figure 5:
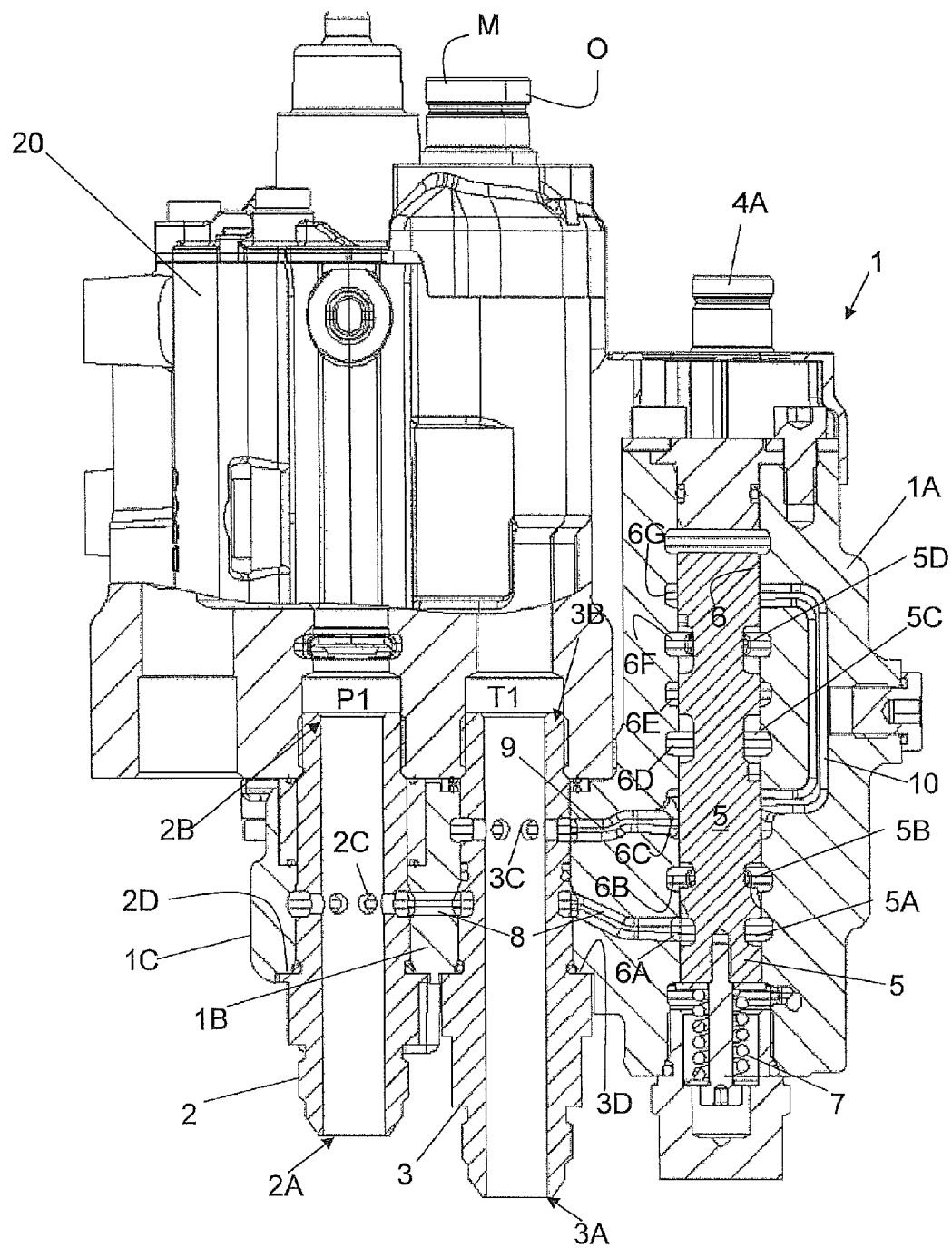
FIG. 5-10 shows different cross-sectional views of the valve set according to the present invention in three different positions and from two different angles.
Figure 6:
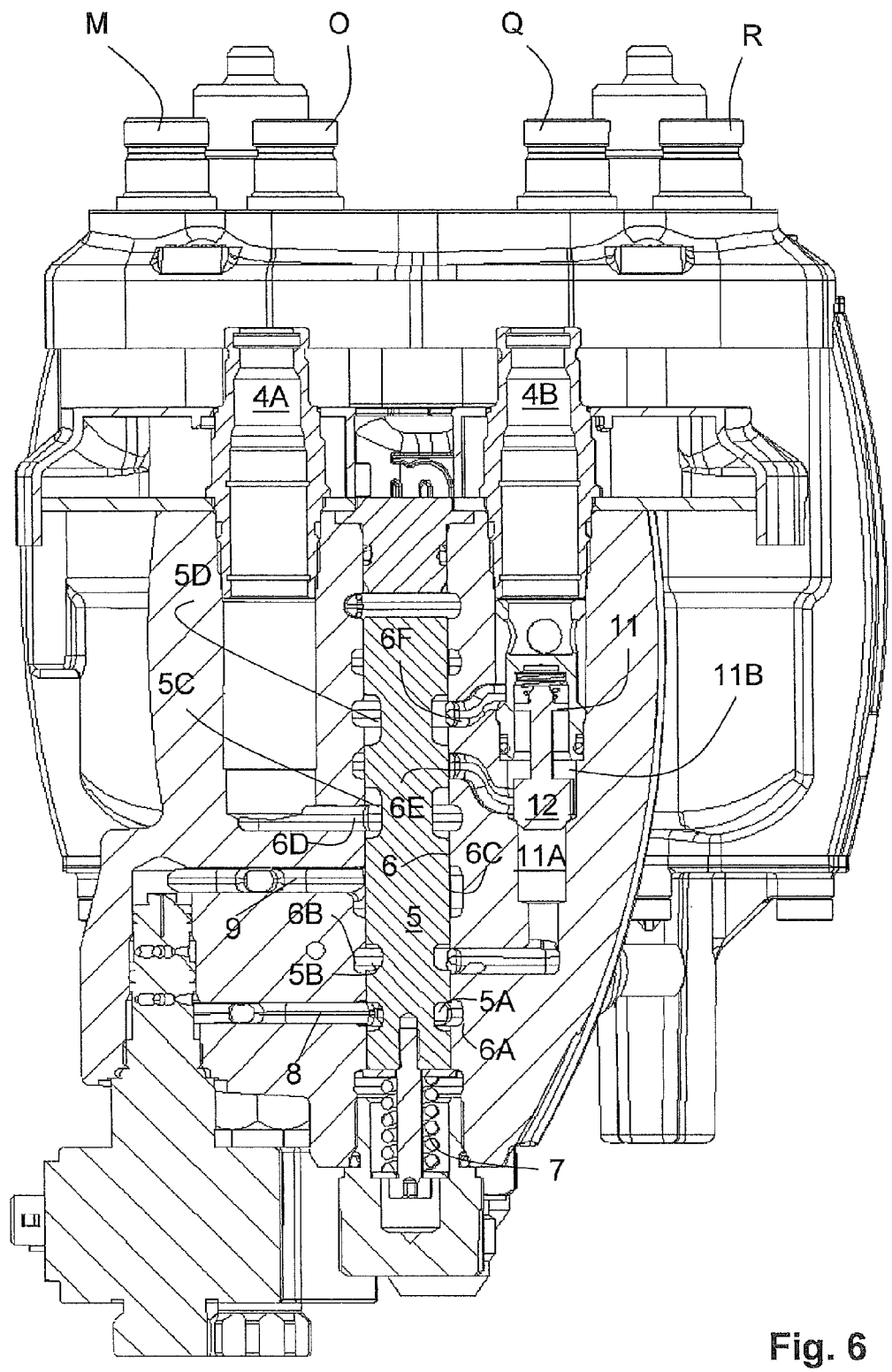
Figure 8:
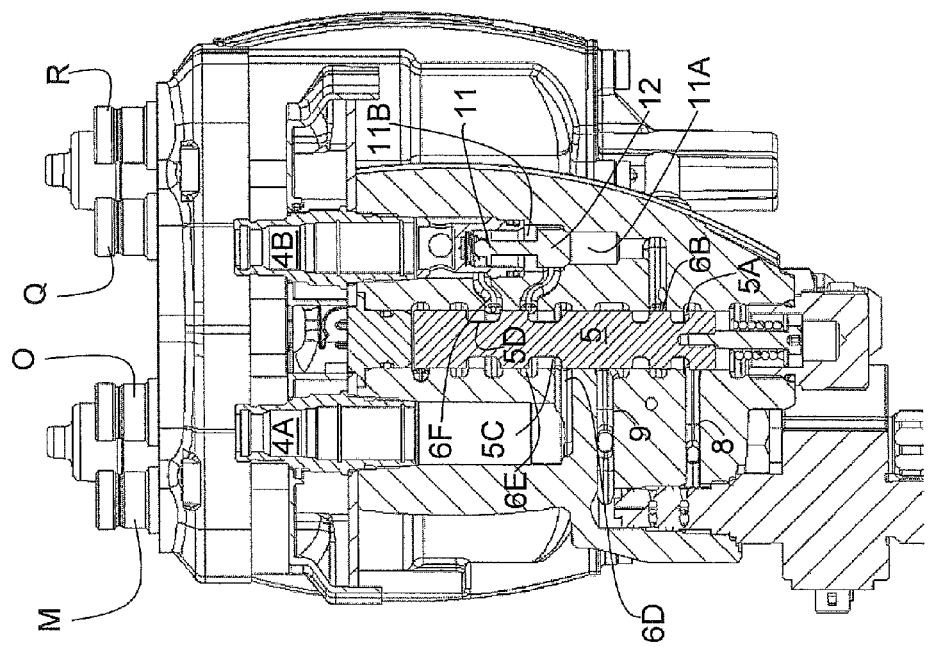
Figure 7:
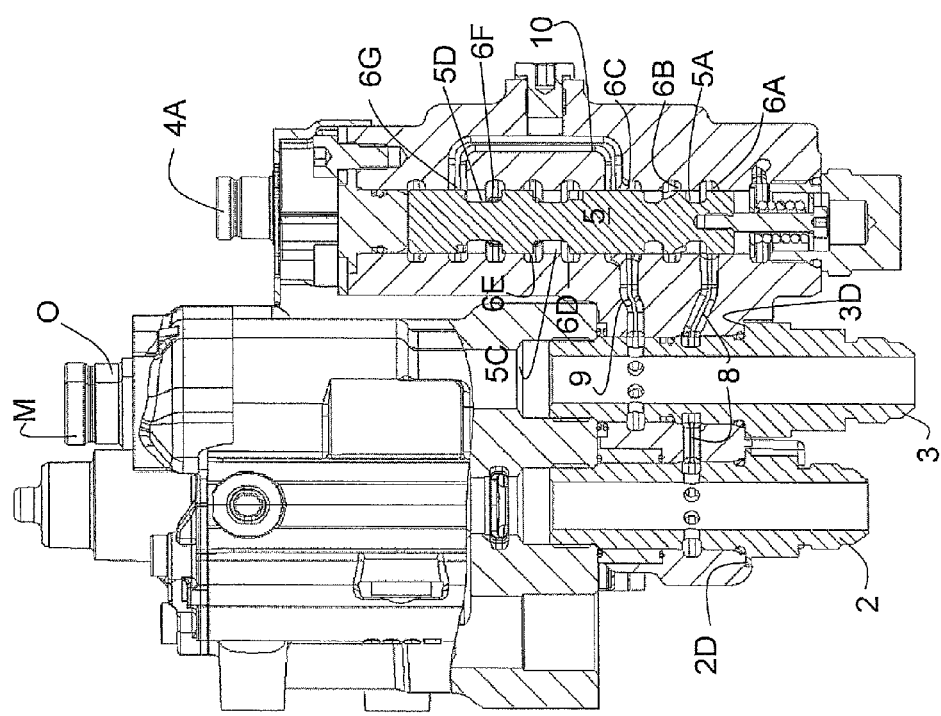
Figure 10:
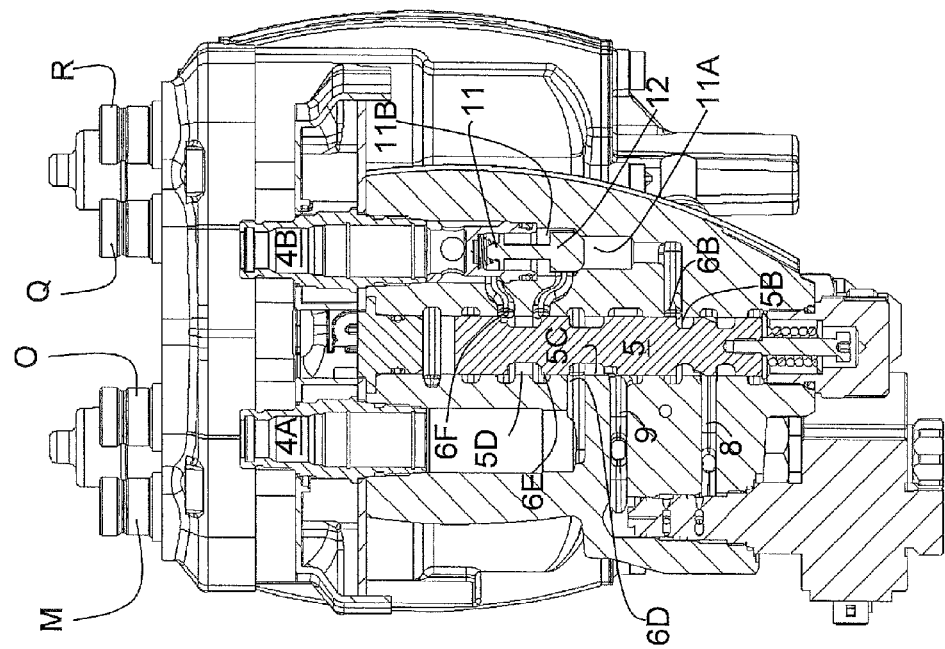
Figure 9:
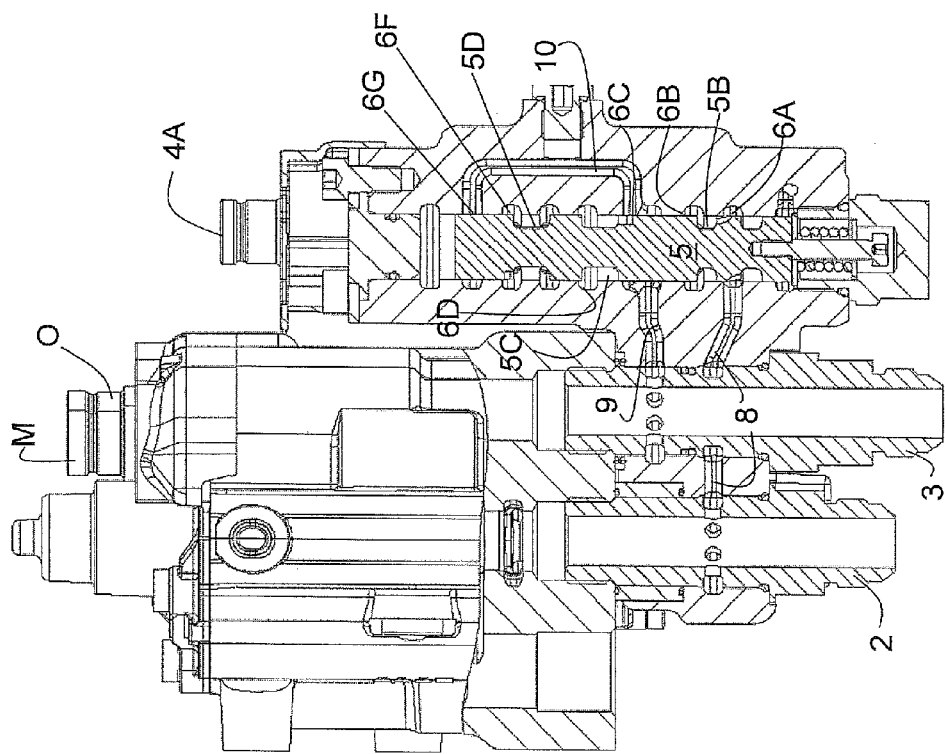

In FIGS. 5-10, the main valve 20 according to the present invention is shown provided with an auxiliary valve 1 according to the present invention arranged at its pump connection port P1 and the tank connection port T1. The FIGS. 5, 7, and 9 shows a cross-sectional view of the auxiliary valve 1, from a first angle, while the FIGS. 6, 8, and 10 shows the same auxiliary valve 1 from another angle perpendicular in relation to the direction of the first view. The Figures differ from each other in how the valve slide 5 of the auxiliary valve 1 is positioned inside the valve housing 6. In FIGS. 5 and 6, the valve slide 5 is arranged in a closed position, while in FIGS. 7 and 8, and FIGS. 9 and 10, respectively, it is arranged in two from each other separate opened positions. The different functional positions will be described in detail below. However, the auxiliary valve 1 generally works in the same way as the control valve shown in FIG. 2, with the essential difference that it is adapted to be connected in series to a main valve 20.

The valve slide 5 is by means of a pre-stressed spring 7 held in an initial position and is arranged with a fluid-tight fit inside the valve housing 6. Furthermore, it comprises four slide recesses 5A-5D provided in the outer surface of the valve slide and which may be in communication with seven housing recesses 6A-6G provided in the inner wall of the valve housing 6 depending on how the operator controls the valve slide 5. Both the slide recesses 5A-5D and the housing recesses 6A-6G are referenced to in alphabetical order from below and upwards and due to the limited space all reference numbers are not indicated in all the Figures. However, in FIGS. 5 and 6, they are all represented and it is to be noted that both the slide recesses 5A-5D and the housing recesses 6A-6G are circumferential, such that the valve slide 5 is free to rotate in respect to the valve housing 6, without risking that the flow controlling interaction between the recesses is effected.

The auxiliary valve 1 is also provided with two lead-throughs 2 and 3, which in the shown embodiment consist of two nipples. The pump lead-through 2 is enclosed by a pump enclosing part 1C of the auxiliary valve 1 and has a first end provided with a connection 2A to a conduit leading to the pump and a second end provided with a connection 2B to the pump input port P1 of the main valve 20. In a corresponding way, the tank lead-through 3 is enclosed by a tank enclosing part 1B of the auxiliary valve 1 and has a first end, provided with a connection 3A to a conduit leading to the tank and a second end provided with a connection 3B to the tank input port T1 of the main valve 20. Both of the lead-throughs 2 and 3 has a connection opening, 2C and 3C, respectively to the main part 1A of the auxiliary valve, which acts as a control valve and comprises the valve housing 6 and the valve slide 5.

The shown lead-throughs 2 and 3, respectively, comprises a shoulder 2D and 3D, respectively (see FIG. 5), which in the mounted position are adapted to bear against corresponding shoulders of the tank- and pump enclosing parts 1B and 1C, respectively. These shoulders are arranged such that the lead-throughs will be in the right place at the installation, such that e.g. the connection openings 2C and 3C, respectively will be centrally arranged to the connections 8 and 9, respectively.

In the most basic embodiment of the present invention, the lead-throughs 2 and 3, in a simple manner, consist of hydraulic conduits at which an auxiliary valve 1 is fastened. However, a problem with such a solution is that it is difficult to achieve fluid-tight connections, which at the same may withstand a certain mechanical stress, for which reason some kind of attachment, which preferably may be achieved by means of nipples in the form of a length of tubing, is necessary. However, other solutions which in their turn are known to the person skilled in the art are obtainable.

A pump connection 8 through both of the enclosing parts 1C and 1B connects the pump lead-through 2, via its connection opening 2C, with a first housing recess 6A in the valve housing 6 and a tank connection 9 through the tank enclosing part 1B connects the pump lead-through 3, via its connection opening 3C with a third housing recess 6C. When the valve is in a closed position, as shown in FIGS. 5 and 6, the first housing recess 6A is centred to the fist slide recess 5A and since it is not in connection with any other recess, hydraulic fluid can not flow any further from these recesses 5A and 6A. The tank connection 9 is extended by a housing connection 10 to the seventh housing recess 6G, which when the valve slide 5 is in the shown position is in no further fluid communication. Thus, in this position there is no flow in any direction.

In FIG. 6 the auxiliary valve is shown in the same closed position along a cross-section perpendicular in relation to the one shown in FIG. 5. In FIG. 6 it may be seen how the second housing recess 6B via a non-return valve 11 is in communication with the fifth housing recess 6E, which in the closed position is in closed contact to the cylinder surface of the valve slide. In the same Figure it is also shown that the fourth housing recess 6D is in communication with a first motor port connection 4A, which is adapted to be connected to the suction side of a pressure cylinder, i.e. the cylinder chamber which is not pressurized at normal load on the pressure cylinder, below referred to as the lowering chamber. Further, the sixth housing recess 6F is connected to a second motor port connection 4B, which is adapted to be connected to the pressure side of a pressure cylinder, i.e. the cylinder chamber which is pressurized at normal load, below called lifting chamber. The non-return valve slide 12 in the non-return valve 11 is arranged such that the pump pressure, which always is provided via the second housing recess 6B to the inlet side 11A of the non-return valve, must work in opposite direction with respect to the current pressure in the motor port connection which is to be filled and which acts downwards on the non-return valve slide 12 at the outlet side 11B of the non-return valve, independent of which one of the motor port connections 4A or 4B the pump flow is directed to.

In FIGS. 7 and 8 the auxiliary valve 1 is shown in a first opened position, where the valve slide 5 has moved upwards, whereby the pump connection 8 is connected to the first motor port connection 4A. The connection runs via the first housing recess 6A and the first slide recess 5A to the second housing recess 6B. Since the second housing recess 6B is connected to the inlet side of the non-return valve 11, when the pump pressure exceeds the current pressure in the first motor port connection 4A and which in this position acts downwards on the non-return valve slide 12, the flow will pass the non-return valve slide 12 and further out in the fifth housing recess 6E. When the valve slide is placed in this first opened position, the fifth housing recess 6E, thanks to the third slide recess 5C, is connected to the fourth housing recess 6D which is directly connected to the first motor port connection 4A. Thereby, when the valve is in this position, the pump flow may fill the lowering chamber which is connected to the first motor port connection 4A. At the same time, the hydraulic fluid which is pressed out of the lifting chamber, will flow through the second motor port connection 4B and out to the sixth housing recess 6F (see FIG. 8). Further, the same flow will run via the fourth valve recess 5D to the seventh housing recess 6G which, via the housing connection 10, is connected to the third housing recess 6C, which leads the flow onto the tank via the tank connection 9 and the tank lead-through 3.

In FIGS. 9 and 10, the auxiliary valve 1 is shown in a second opened position, where the valve slide 5 has been moved downwards, such that the pumping connection 8 is connected to the second motor port connection 4B. The connection runs via the first housing recess 6A and the second slide recess 5B to the second housing recess 6B. Since the second housing recess 6B is connected to the inlet side 11A of the non-return valve 11, the flow, when the pump pressure exceeds the current pressure in the second motor port connection 4B which in this position acts downwards on the non-return valve slide 12, will pass the non-return valve slide 12 and further out in the fifth housing recess 6E. When the valve slide is placed in this second opened position, the fifth housing recess 6E, due to the fourth slide recess 5D, is connected to the sixth housing recess 6F, which is connected directly to the second motor port connection 4B. Thereby, when the valve is in this position, the pump flow may fill the lifting chamber which is connected to the second motor port connection 4B. At the same time, the hydraulic fluid which is being pressed out of the lowering chamber, will flow through the first motor port connection 4A and out to the fourth housing recess 6D (see FIG. 10). Thereafter, the flow will run, via the third valve recess 5C, to the third housing recess 6C, which leads the flow further to tank via the tank connection 9 and the tank lead-through 3.

In FIGS. 6, 8 and 10 it may also be seen that the main valve 20 has four motor port connections M, O, Q and R consisting of two pairs connected to opposite sides of separate pressure cylinders.

The present invention is described with reference to specific embodiments. However, the present invention is not limited to these embodiments, but is only limited by the following claims.

The invention claimed is:

1. Hydraulic auxiliary valve device connectable to a hydraulic main valve on a work vehicle, which work vehicle comprises a hydraulic system including a pump and a tank, the auxiliary valve device comprising:
   a first motor port connection and a second motor port connection arranged to be connected to a first motor port and a second motor port, respectively, on a double acting hydraulic motor, in particular a double acting hydraulic cylinder,
   an inlet connection connectable to a hydraulic system on the work vehicle, which inlet connection comprises a pump input port connectable to the pump of the hydraulic system, and a tank input port connection connectable to the tank of the hydraulic system;
   an outlet connection connectable to the main valve, which outlet connection comprises a pump connection output port connectable to a pump input port on the main valve, and a tank connection output port, connectable to a tank input port on the main valve;
   a pump lead-through, in the form of a length of tubing, having two opposed ends which connects the pump input port connection of the auxiliary valve device to the pump connection output port;
   a tank lead-through, in the form of a length of tubing, having two opposed ends which connects the tank input port connection of the auxiliary valve device to the tank connection output port;
   a control valve provided with two open positions, which control valve in the first open position connects the pump input port connection to the first motor port connection and the tank input port connection to the second motor port connection, and in the second open position connects the pump input port connection to the second motor port connection and the tank input port connection to the first motor port connection;
   the pump and tank lead-through lengths of tubing, between the opposed ends, and including openings connectable to the control valve to connect the pump input port connection and the tank input port connection to the motor port connections of the auxiliary valve device, and wherein the lengths of tubing are detachable with respect to a main part of the auxiliary valve device.

2. Hydraulic auxiliary valve device according to claim 1, wherein each length of tubing comprises a shoulder, which is adapted to bear against a corresponding shoulder on said main part when connected correctly.

* * * * *